(12) United States Patent
Morris et al.

(10) Patent No.: US 7,809,278 B2
(45) Date of Patent: Oct. 5, 2010

(54) APPARATUS AND METHOD OF PROVIDING SEPARATE CONTROL AND DATA CHANNELS BETWEEN ARRAYS OF LIGHT EMITTERS AND DETECTORS FOR OPTICAL COMMUNICATION AND ALIGNMENT

(75) Inventors: Terrel L. Morris, Garland, TX (US); David Martin Fenwick, Chelmsford, MA (US); Richard John Luebs, Windsor, CO (US); Duane A. Wegher, Ft. Collins, CO (US); Jeffrey D. Yatter, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1322 days.

(21) Appl. No.: 10/898,834

(22) Filed: Jul. 26, 2004

(65) Prior Publication Data

US 2006/0018216 A1    Jan. 26, 2006

(51) Int. Cl.
*H04B 10/00* (2006.01)
(52) U.S. Cl. .................... 398/156; 398/131; 398/130; 398/129; 398/158
(58) Field of Classification Search ................. 398/131, 398/140, 143, 130, 129, 128, 156, 123, 158; 369/47.1, 30.34
See application file for complete search history.

(56) References Cited

U.S. PATENT DOCUMENTS

| 4,545,074 A | 10/1985 | Balliet et al. |
| 4,568,931 A | 2/1986 | Biolley et al. |
| 5,023,863 A | 6/1991 | Masuda |
| 5,123,073 A | 6/1992 | Pimpinella |
| 5,218,654 A | 6/1993 | Sauter |

(Continued)

FOREIGN PATENT DOCUMENTS

EP    0 311 772    4/1989

(Continued)

OTHER PUBLICATIONS

B. Robertson, et al., "Design and Operation of an in situ Microchannel Alighment-Detection System", Applied Optics, vol. 37, No. 23, Aug. 10, 1998, p. 5368-5376.

(Continued)

*Primary Examiner*—Ken N Vanderpuye
*Assistant Examiner*—Hibret A Woldekidan (57) ABSTRACT

A method of aligning optical data communication channels between system functions comprises: emitting an array of light beams from a corresponding array of data emitters in response to electrical data signals generated from a first system function; emitting light beams from two control emitters in response to electrical control signals generated from the first system function; receiving light beams from the data emitters by a corresponding array of data detectors to form an array of data optical communication channels; conducting electrical data signals reproduced from the received data emitter light beams to a second system function; receiving light beams from the two control emitters by two control detector sections to form two control optical communication channels; conducting electrical control signals reproduced from the received control emitter light beams to a second system function; monitoring a multiplicity of light detectors of each of the two control detector sections to determine an offset in optical channel alignment; and controlling the optical channel alignment based on the determined offset.

37 Claims, 9 Drawing Sheets

U.S. PATENT DOCUMENTS

| | | | |
|---|---|---|---|
| 5,227,906 A * | 7/1993 | Tokumitsu | 398/55 |
| 5,245,680 A | 9/1993 | Sauter | |
| 5,420,954 A * | 5/1995 | Swirhun et al. | 385/92 |
| 5,430,442 A | 7/1995 | Kaiser et al. | |
| 5,465,379 A | 11/1995 | Li et al. | |
| 5,477,363 A | 12/1995 | Matsuda | |
| 5,497,465 A | 3/1996 | Chin et al. | |
| 5,515,195 A | 5/1996 | McAdams | |
| 5,585,783 A * | 12/1996 | Hall | 340/473 |
| 5,600,748 A | 2/1997 | Kosaka | |
| 5,631,988 A | 5/1997 | Swirhun et al. | |
| 5,764,834 A | 6/1998 | Hultermans | |
| 5,920,664 A | 7/1999 | Hirabayashi et al. | |
| 6,014,206 A * | 1/2000 | Basting et al. | 356/138 |
| 6,185,648 B1 | 2/2001 | Munoz-Bustamante | |
| 6,334,784 B1 | 1/2002 | Howard | |
| 6,363,182 B2 | 3/2002 | Mills et al. | |
| 6,379,053 B1 | 4/2002 | van Doorn | |
| 6,430,335 B1 | 8/2002 | Carberry et al. | |
| 6,509,992 B1 | 1/2003 | Goodwill | |
| 6,527,456 B1 | 3/2003 | Trezza | |
| 6,580,865 B1 | 6/2003 | Doorn | |
| 6,583,445 B1 | 6/2003 | Reedy et al. | |
| 6,583,904 B1 | 6/2003 | Mahlab et al. | |
| 6,587,605 B2 | 7/2003 | Paniccia et al. | |
| 6,588,943 B1 | 7/2003 | Howard | |
| 6,603,899 B1 | 8/2003 | Popp et al. | |
| 6,628,860 B1 | 9/2003 | Van Doorn | |
| 6,634,812 B2 | 10/2003 | Ozeki et al. | |
| 6,651,139 B1 | 11/2003 | Ozeki et al. | |
| 6,661,546 B1 * | 12/2003 | Plett | 359/15 |
| 6,661,940 B2 | 12/2003 | Kim | |
| 6,674,971 B1 | 1/2004 | Boggess et al. | |
| 6,775,480 B1 * | 8/2004 | Goodwill | 398/158 |
| 6,894,623 B2 * | 5/2005 | Hama et al. | 340/815.54 |
| 7,155,129 B2 * | 12/2006 | Bringans et al. | 398/131 |
| 7,653,108 B2 * | 1/2010 | Morris et al. | 372/50.12 |
| 2002/0149825 A1 | 10/2002 | Levy et al. | |
| 2002/0163294 A1 * | 11/2002 | Derraa | 313/495 |
| 2002/0178319 A1 | 11/2002 | Sanchez-Olea | |
| 2003/0081281 A1 | 5/2003 | DeCusatis et al. | |
| 2003/0090765 A1 * | 5/2003 | Neff et al. | 359/172 |
| 2004/0057730 A1 * | 3/2004 | Littlejohn et al. | 398/156 |
| 2004/0208422 A1 * | 10/2004 | Hagood et al. | 385/16 |
| 2004/0208439 A1 * | 10/2004 | Bell et al. | 385/32 |

FOREIGN PATENT DOCUMENTS

| | | |
|---|---|---|
| EP | 0 351 729 | 1/1990 |
| EP | 0 367 460 | 9/1990 |
| EP | 0 811 862 | 10/1997 |
| EP | 0 868 049 | 9/1998 |
| EP | 1 180 912 | 2/2002 |

OTHER PUBLICATIONS

B. Robertson, "Design of an Optical Interconnect for Photonic Backplane Applications", Applied Optics, vol. 37, No. 14, May 10, 1998, p. 2974-2984.

M. Jonsson, et al. "Optical Interconnection Technology in Switches, Routers and Optical Cross Connects", Ericsson Report, p. 1-43.

R. Sims, "Scaling Laws for MEMS Mirror-Rotation Optical Cross Connect Switches", Journal of Lightwave Technology, vol. 20, No. 7, Jul. 2002, p. 1084-1094.

F. Tooley, "Challenges in Optically Interconnecting Electronics", IEEE Journal of Selected Topics in Quantum Electronics, vol. 2, No. 1, Apr. 1996, p. 3-13.

* cited by examiner

APPARATUS AND METHOD OF PROVIDING SEPARATE CONTROL AND DATA CHANNELS BETWEEN ARRAYS OF LIGHT EMITTERS AND DETECTORS FOR OPTICAL COMMUNICATION AND ALIGNMENT

BACKGROUND OF THE INVENTION

The present invention relates generally to optical communication systems, and more particularly, to apparatus and method of providing separate control and data channels between arrays of light emitters and detectors for optical communication and alignment.

Greater demands for increased bandwidth are being made on data communication between electrical data processing units or subunits, like printed circuit (PC) boards, for example. Communication rates of tens of gigabits per second are exemplary of such demands. These demands can not be met by traditional metal electrical connections, like those found on mother boards and back plane connections, for example. One solution to meet these demands is to create optical communication channels for unit-to-unit communication using light coupling between an array of light emitters connected electrically to one subunit and an array of light detectors connected electrically to another subunit. In this solution, there is a one-to-one relationship between the light emitters and detectors of the arrays.

A drawback to this solution is that each light emitter of the emitting array must be precisely aligned with a corresponding light detector of the detecting array to form an optical communication channel. This precise alignment is no simple task and generally requires additional equipment and man-hours to achieve. In addition, once the precise alignment is initially achieved, it may have to be repeated from time to time, due to misalignment due to such effects as shock, vibration, temperature changes and the like, for example.

Another drawback is that each optical communication channel generally communicates both data and control information between the units or subunits, thus reducing the available channel bandwidth for data communication. Communicating data and control information over the same channel requires a multiplexing function at one end and a demultiplexing function at the other end. Accordingly, the combination of data and control information over the same channels adds to system design complexity and reduces system performance.

The present invention overcomes the drawbacks of the present optical communication systems and provides apparatus and method which reduces the complexity of system design and improves system performance.

SUMMARY

In accordance with one aspect of the present invention, apparatus for providing separate data and control optical communication channels between system functions comprises: an array of data emitters operative in response to electrical data signals generated from a first system function for emitting an array of corresponding light beams representative of the data signals; at least one control emitter operative in response to electrical control signals generated from the first system function for emitting light beams representative of the control signals; an array of data detectors for receiving light beams from corresponding data emitters of the emitter array to form an array of data optical communication channels, and conducting electrical data signals reproduced from the received light beams to a second system function; and at least one control detector section comprising a multiplicity of light detectors in close proximity to each other for receiving light beams from the at least one control emitter to form at least one control optical communication channel, and conducting electrical control signals reproduced from the received light beams to a second system function.

DETAILED DESCRIPTION OF THE INVENTION

Figure 1:
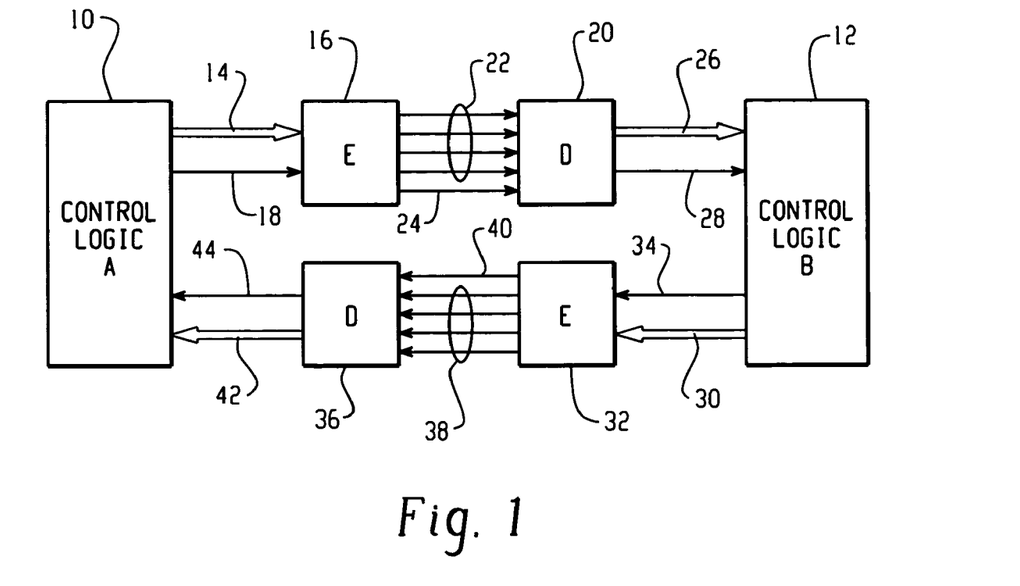
FIG. 1 is a block diagram schematic of apparatus for optical communication between two system functions suitable for embodying one aspect of the present invention.

FIG. 1 is a block diagram schematic of apparatus for optical communication between two system functions suitable for embodying one aspect of the present invention. The optical communication may be either unidirectional or bi-directional as shown by the diagram of FIG. 1. Referring to FIG. 1, blocks 10 and 12 represent control logic of system functions A and B, respectively. Each system function A and B may be instantiated in several forms, including but not limited to printed circuit (PC) board wiring connections, integrated circuit (IC) package substrate connections or chip or die wiring connections, for example. Also, each control logic block 10 and 12 may transmit data and control information from one system function to the other, receive data and control information from the other system function and couple it to one system function, or perform a combination thereof.

Control logic block 10 transmits data electrically over data lines 14 to corresponding light emitters of a light emitter array 16, and transmits control signals electrically over separate control lines 18 to corresponding light emitters of array 16 which are separate from the data emitters which will become more evident from the description infra. The data light emitters of array 16 are light coupled, when properly aligned, to corresponding light detectors of a light detector array 20 over corresponding optical paths 22, and the control light emitters of array 16 are light coupled to a group of corresponding light detectors of array 20 over one or more optical paths 24 which are separate from paths 22. Data and control signaling received respectively by data and control light detectors of array 20 are communicated electrically to control logic block 12 over data lines 26 and separate control lines 28, respectively. In this manner, the logic block 10 may communicate optically and uni-directionally with the logic block 12 over separate data and control optical paths.

In a similar way, control logic block 12 transmits data electrically over data lines 30 to corresponding light emitters of a light emitter array 32, and transmits control signals electrically over separate control lines 34 to corresponding light emitters of array 32 which are separate from the data emitters which will become more evident from the description infra. The data light emitters of array 32 are light coupled, when properly aligned, to corresponding light detectors of a light detector array 36 over corresponding optical paths 38, and the control light emitters of array 32 are light coupled to a group of corresponding light detectors of array 36 over one or more optical paths 40 which are separate from paths 38. Data and control signaling received respectively by data and control light detectors of array 36 are communicated electrically to control logic block 10 over data lines 42 and separate control lines 44, respectively. In this manner, the logic blocks 10 and 12 may communicate optically and bi-directionally over separate data and control optical paths.

The optical media through which light is coupled between the light emitter and detector arrays may include free-space optics, fiber optics, planar waveguide optics and other similar optical media, for example. The light coupling through the optical medium between a light emitter and detector forms an optical channel over which either data or control signals are communicated. Note that the optical channels designated as data channels communicate only data and the separate optical channels designated as control channels communicate only control signals and information. Thus, in the present embodiment, control signals and data do not have to be inter-digitated or multiplexed over the same optical communication channel and thus, all of the channel bandwidth of a data channel is available for data which may be communicated uninterrupted notwithstanding the concurrent transmission of control information.

Also, in the present embodiment, the separate control channels may transmit control information which may be used by the logic units 10 and 12 to modify the electrical attributes of the data channels. Examples include, but are not limited to: controlling the voltage levels of the electrical outputs of optical detectors, controlling the drive impedance of the electrical outputs of optical detectors, controlling the voltage references of the electrical inputs to optical emitters, and controlling the sensitivity, gain, and frequency bandwidth of the electrical inputs to optical emitters, for example. In addition, the separate control channels may also transmit control information which may be used by the logic units 10 and 12 to modify the optical attributes of the data channels. Examples include, but are not limited to: controlling the optical power levels of the light emitters; controlling the light/dark bit times in order to optimize DC balance of the optical emitters; and controlling the sensitivity of optical detectors.

Further, the separate control channels may be used for detecting array offset deflection dynamically, and for communicating such offset information to the proper logic unit 10 or 12 to provide for re-alignment of the data arrays by positioning or beam steering to optimize the light coupling between the light emitters and light detectors without interfering with data communication. In one embodiment, light beams emitted from the data emitters may be steered in order to compensate for translational and rotational deflection of one array with respect to the other array, particularly as related to vibration compensation, thermal compensation or compensation for a dynamic condition, in general. Note that for pure translational deflection, all of the beams of the data emitters of the array may be steered concurrently by the same offset. However, for rotational deflection, a beam steering angle is calculated for each data emitter of the array based primarily on the offset angle of rotation and the emitter's location along the radius of rotation. For example, those data emitters close to the center of rotation will incur little offset and those emitters located in the array at the end of the radius of rotation will incur maximum offset. In another embodiment, the data emitter array may be mechanically positioned with respect to the corresponding data detector array to compensate for the determined translational and rotational deflection offsets of one array with respect to the other array.

It is understood that it is important that the optical control channels be initially roughly aligned in order to effectively communicate the control information between the system functions. Accordingly, during communication the optical control channels may be utilized to detect and compensate for optical channel mis-alignment as will be described in greater detail herein below. However, loss of control communication from an optical control channel during communication between the system functions may be grounds for an action to be taken. Preferably, when communication over an optical control channel is lost for whatever reason, the communication between system functions may be suspended until the optical arrays are realigned in order to regain the lost communication over the optical control channel. This may be accomplished by automatic control or through an alarm indication to an operator.

Figure 2:
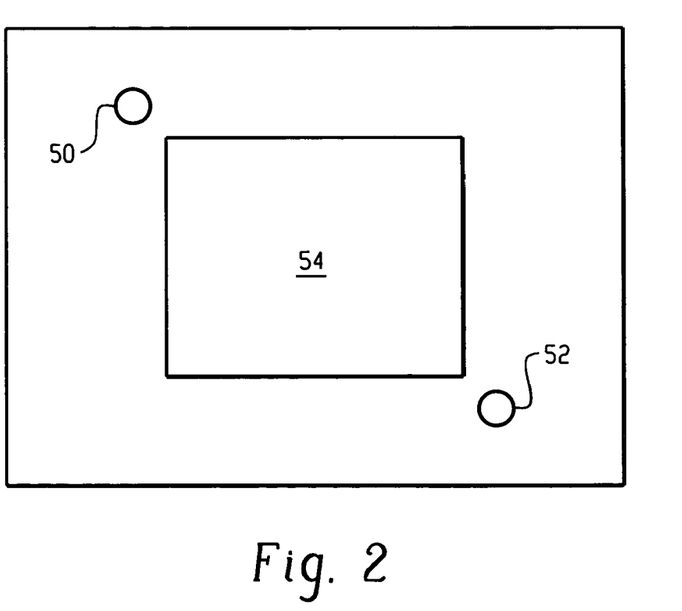
FIG. 2 is a top view of an exemplary embodiment of sections of emitter arrays or detector arrays suitable for use in the embodiment of FIG. 1.

FIG. 2 is a top view of an exemplary embodiment of the sections of the emitter arrays 16, 34 and the detector arrays 20, 36 suitable for use in the apparatus shown in FIG. 1. In this view, two control emitter/detector sections 50 and 52 are disposed at diagonal corners of and physically separate from their corresponding data emitter/detector array section 54, but all three sections 50, 52 and 54 may be fabricated on the same substrate. The optical channels of the data arrays are optimized when the emitters of the data emitter array are aligned with the corresponding detectors of the data detector array. The positioning of the control detector sections 50, 52 allows a "target" to be formed at the diagonal corners of the data array section 54 to guide positioning of the emitted beams from the corresponding emitter array. If all emitted beams from all of the emitters of an emitter array are made to track equally and in the same direction within acceptable limits, then when both emitted control beams spot illuminate the center of their corresponding target detector section, the emitted data beams will be properly aligned with their corresponding data detectors as will become more evident from the following description. If needed, more than one physical detector may be assigned to a logical data signal bit. Note that while two control detector sections 50, 52 are used in the present embodiment, the actual number of control detector sections may be greater than two, and in some cases, with specific rotational limitations, may be as few as one.

Figure 3:
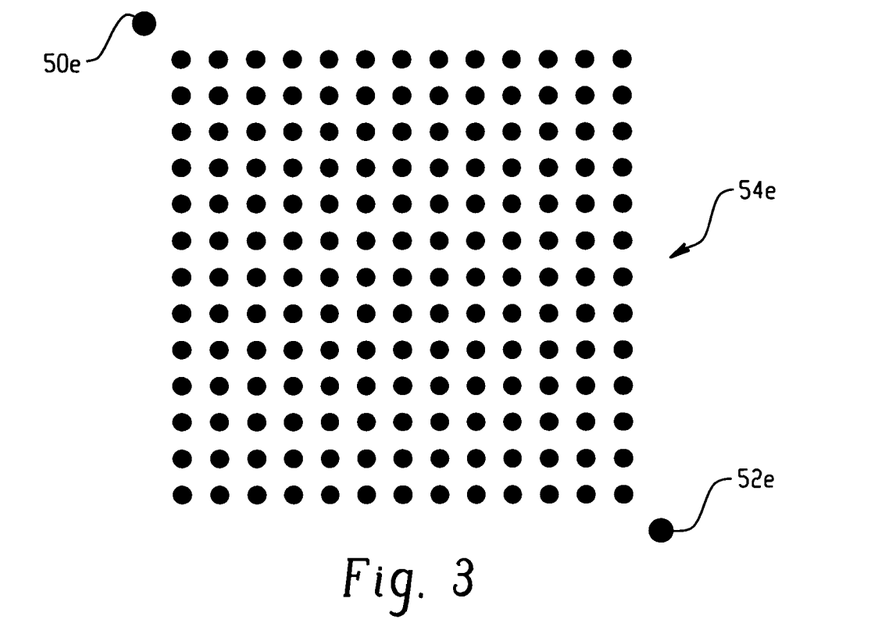
FIG. 3 is a top view of an exemplary embodiment of a data emitter array and two control emitters suitable for use in the embodiment of FIG. 2.
Figure 4:
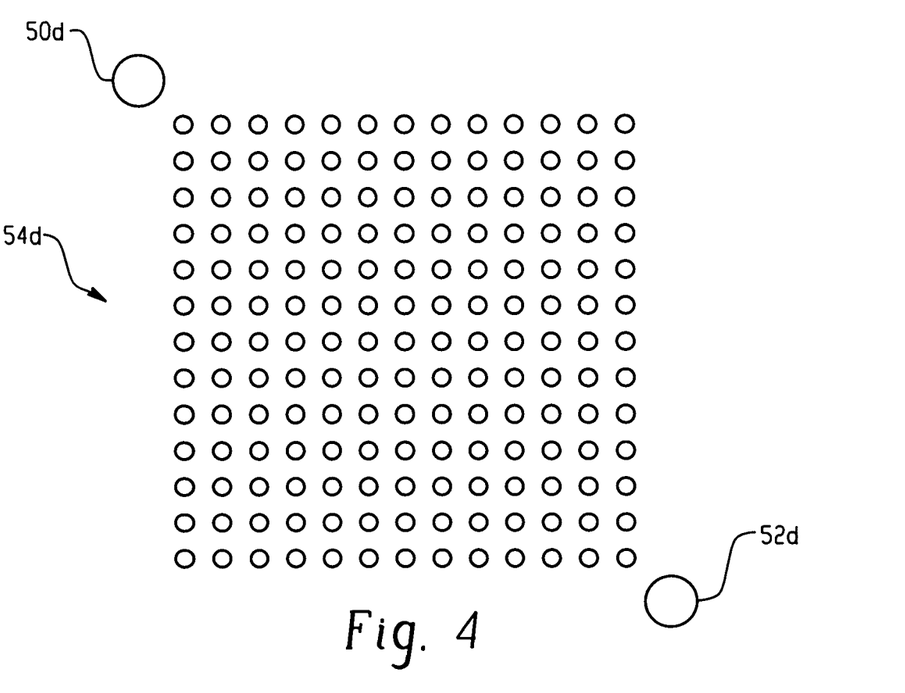
FIG. 4 is a top view of an exemplary embodiment of a data detector array and two control detector sections suitable for use in the embodiment of FIG. 2.

An exemplary embodiment of the data emitter array 54*e* and separate control emitters 50*e* and 52*e* is shown in the top view of FIG. 3. Note that the darkened circles are representative of the data and control light emitters, which may be of the low-power, vertical cavity surface emitting laser (VC-SEL) type, for example, and that the data emitter array is a rectangular array of rows and columns. An exemplary embodiment of the data detector array 54*d* and separate control detector sections 50*d* and 52*d* is shown in the top view of FIG. 4. Note that the clear circles are representative of the data light detectors, which may be of the avalanche photo-diode (APD) type, for example, and control detector sections and that the data detector array is a rectangular array of rows and columns. In the present embodiment, the array 54*d* is fabricated to be a carbon copy of the array 54*e* within acceptable fabrication tolerances, and the control emitters 50*e* and 52*e* are designed to align with the control detector "target" sections 50*d* and 52*d*, respectively, preferably at the centers thereof. Accordingly, the corresponding emitter and detector arrays may be disposed with respect to each other such that when the emitted beams of the control emitters 50*e* and 52*e* spot illuminate the center of the respective detector sections 50*d* and 52*d*, all of the emitted beams from the data emitters 54*e* will align with the corresponding data detectors of the detector array 54*d*.

Figure 5:
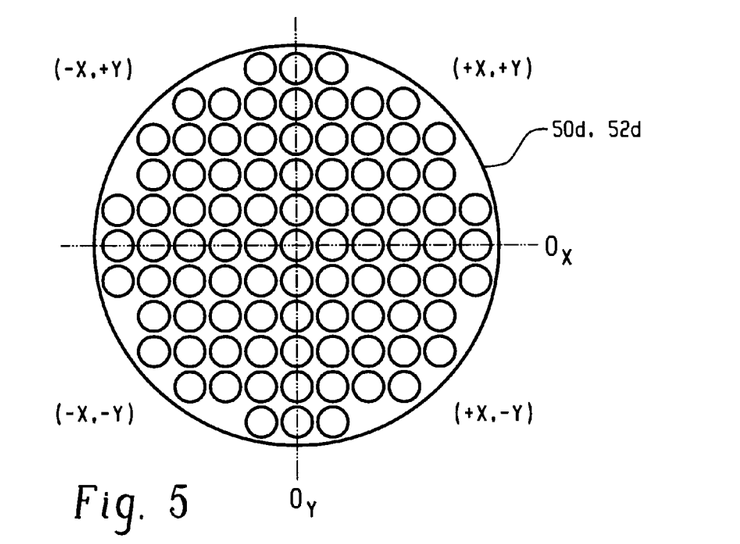
FIG. 5 is a top view of an exemplary control detector section suitable for use in the embodiment of FIG. 4.

FIG. 5 is a top view of an exemplary control detector "target" section 50*d*, 52*d* suitable for use in the embodiment of FIG. 1. Referring to FIG. 5, each section 50*d*, 52*d* is comprised of a multiplicity of light detectors, which may be of the APD type, for example. In FIG. 5, each light detector is represented by a clear circle. In the present example, the light detectors of each section 50*d* and 52*d* are disposed in close proximity to each other, i.e. almost touching each other, and arranged in rows and columns with a light detector located at the center of a set of orthogonal X, Y coordinates, and a multiplicity of light detectors disposed along each axis X and Y. The light detectors of the control detector sections 50*d* and 52*d* may be used to measure the deflection or displacement offset of one array, e.g. the emitter array, with respect to the other array, e.g. the detector array.

More specifically, each control detector section 50*d*, 52*d* may be divided into four quadrants, with an optimum detector target disposed at coordinate 0,0 located in the center of the section. Traditional X, Y notation is used as noted above to depict the location of the spot illuminated detector relative to the 0,0 array coordinate. The more densely packed the detectors of a control section, the better the position resolution of the beam spot illumination. This light receiving pattern of each control section may be monitored by the associated logic unit 10 or 12 by receiving signals from all of the detectors of a control section and measuring the signal strength of each which will described in greater detail herein below. Preferably, the associated logic unit may monitor all the light detectors of each control section simultaneously. This operation allows the signal strengths of the light detectors of each section to function as an indicator of instantaneous control beam position, while allowing continuous control information to be transmitted and received while the control beam moves about within the corresponding detector section. Since each entire control section is dedicated to one control signal, a logical "or"ing of the output of all detectors may be used, by way of example, to receive the corresponding control signal. This function can be accomplished by either digital or analog techniques, as preferred.

Figure 6:
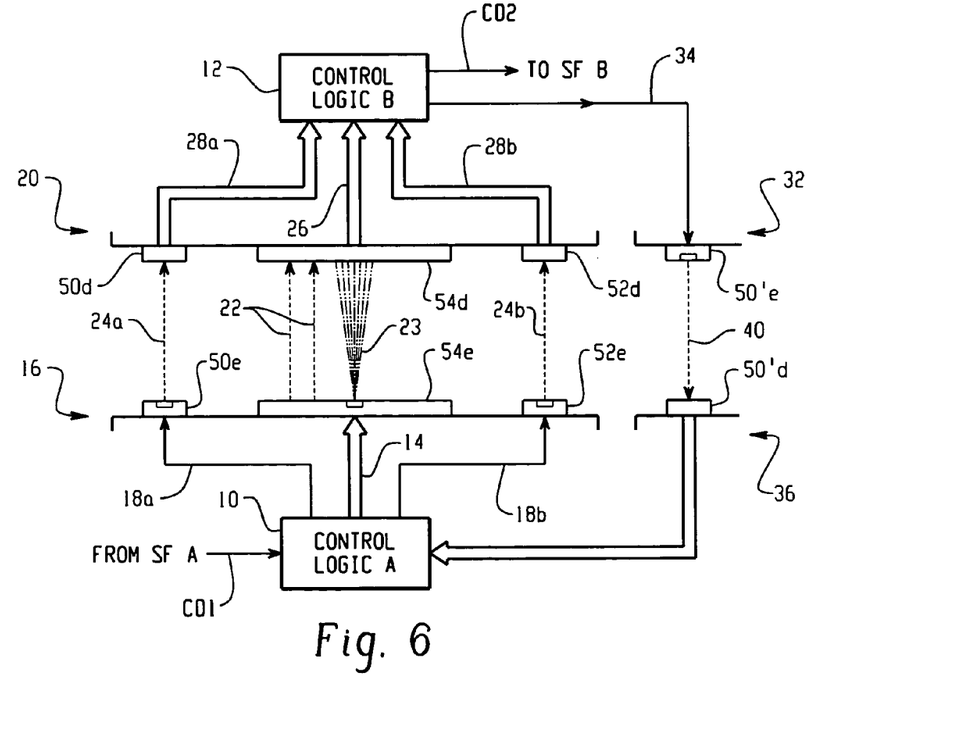
FIG. 6 is an illustration depicting the optical communication apparatus of FIG. 1 in greater detail incorporating the embodiments of FIGS. 2-5.

FIG. 6 is an illustration depicting the optical communication apparatus of FIG. 1 in greater detail incorporating the embodiments described in connection with FIGS. 2-5. While FIG. 6 depicts only control and data flow from system function A to system function B using emitter array 16 and detector array 20, it is understood that the same principles apply to control and data flow from system function B to system function A using emitter array 32 and detector array 36. Referring to FIG. 6, logic unit 10 receives data and control information from system function A over lines CD1 and transmits it to system function B by governing the emission of light beams from control emitters 50*e* and 52*e* of array 16 via signal lines 18*a* and 18*b*, respectively, and governing the emission of light beams from the data array 54*e* via data lines 14. The light beams from 50*e* and 52*e* optically follow paths 24*a* and 24*b* and are received by control detector sections 50*d* and 52*d*, respectively. The light beams from the emitters of array 54*e* optically follow paths 22 to their corresponding data detectors of array 54*d*. In one embodiment, the emitters of array 54*e* may include beam steering capability wherein the beam of each emitter may be steered at a controllable angle to the perpendicular of the array as shown, by way of example, by the variation in beam angle (lines 23) from an exemplary beam steering emitter of array 54*e*.

The control information received by the control detectors of sections 50*d* and 52*d* of array 20 are monitored by the logic unit 12 via signal lines 28*a* and 28*b*, respectively, and the optical data received by the detectors of array 54*d* are monitored by the logic unit 12 via data lines 26. This received control and data information is transferred to system function B over lines CD2, for example. For initial set-up and from time to time during the monitoring operations, logic unit 12 may determine an instantaneous offset of the beam pattern of the arrays through monitoring of the signal strengths of the detectors of the control channel sections 50*d* and 52*d* of array 20. This may be accomplished through execution of an algorithm programmed into a programmed controller or implemented in control circuitry. An exemplary algorithm for this purpose is shown in the flow chart of FIG. 7.

Figure 7:
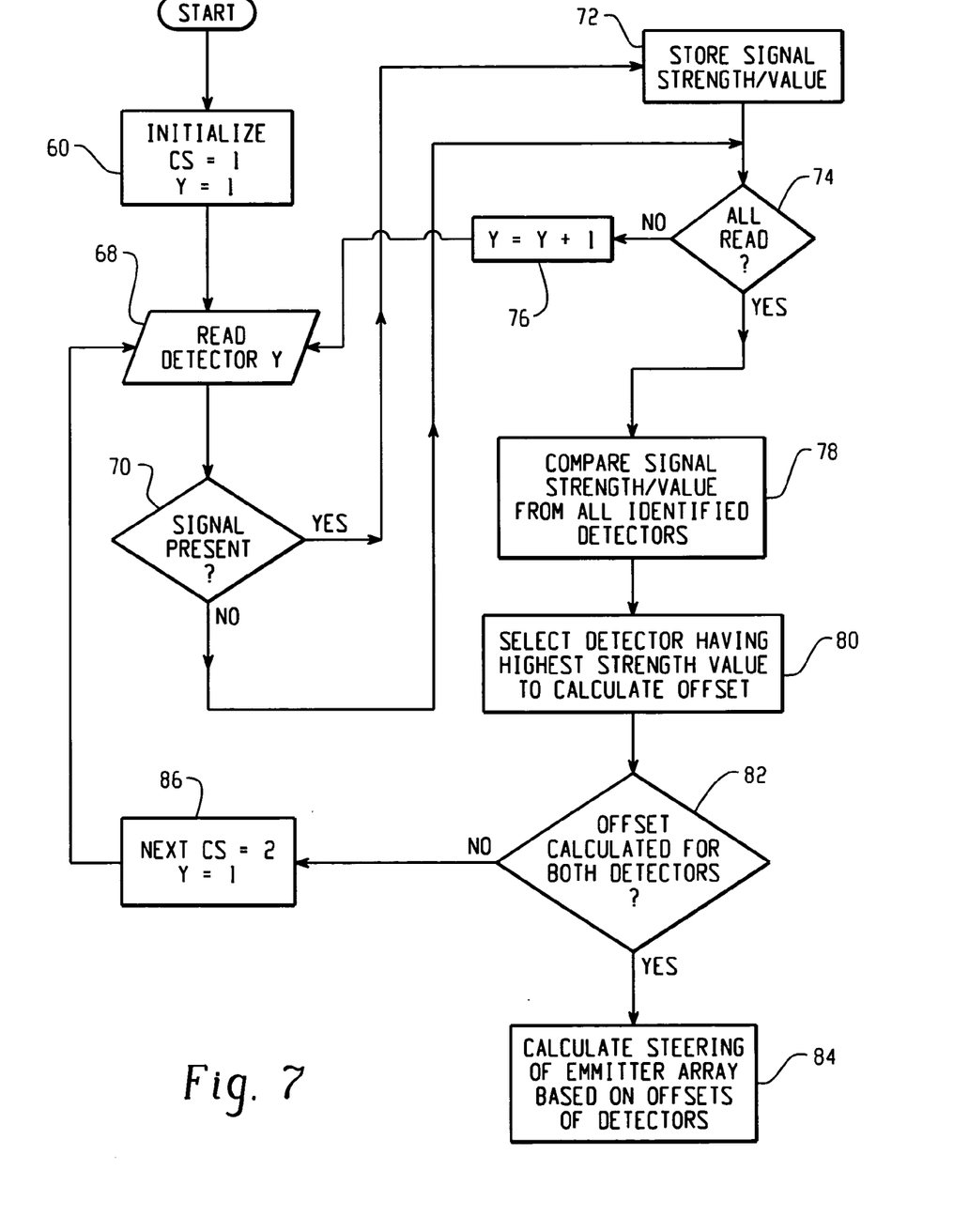
FIG. 7 is a flow chart of an exemplary algorithm suitable for use in the embodiment of FIG. 6.

Referring to FIG. 7, the flow chart commences at block or step 60 wherein the detectors of each detector section 50*d*, 52*d* may be numbered consecutively. Referring to FIG. 5 by way of example, if the detector at the far left of the top row is numbered 1 and the numbering continues consecutively from left to right of each row downward, then the last numbered detector 89 is in the far right of the bottom row. A look-up table may be created to cross-reference the given number of the detector and the corresponding coordinate position (x, y) thereof in the section. For example, detector 1 would be (−1, +5), detector 45 would be (0, 0), and detector 89 would be (1, −5). Also, in step 60, the initial control detector section (CS) (50*d* being 1 and 52*d* being 2) and detector (Y) of the corresponding section are set at 1. In addition, logic unit 12 may communicate certain information to coordinate the offset determination with logic unit 10 over a control information channel between control emitter 50'*e* of array 32 and control detector section 50'*d* of array 36.

Then, in step 68, the detector Y is monitored by the logic unit 12 for the presence of light illumination from the corresponding control emitter. In decisional step 70, it is determined if a signal is present over the respective signal line of detector Y, i.e. light is present. This may be accomplished in step 70 by comparing the monitored signal of detector Y with a predetermined signal level (noise level). If the monitored signal is above the predetermined signal level, a signal (light) is considered present and execution continues at block 72 wherein the number and the signal strength or value of the detector is stored away in a designated register of a memory of the logic unit 12; otherwise, block 72 is circumvented. Next, in block 74, it is determined if all of the detectors of section 1 have been read or monitored. If not, then in block 76 the next detector in consecutive order is selected and blocks 68-74 are re-executed.

Figure 8:
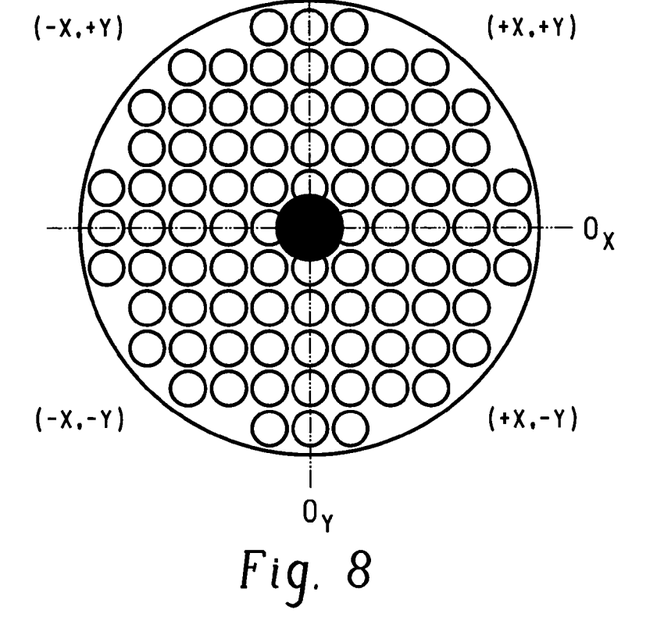
FIGS. 8 and 9 are exemplary illustrations of different beam spot illuminations of a control detector section for use in determining an offset in optical channel alignment.
Figure 9:
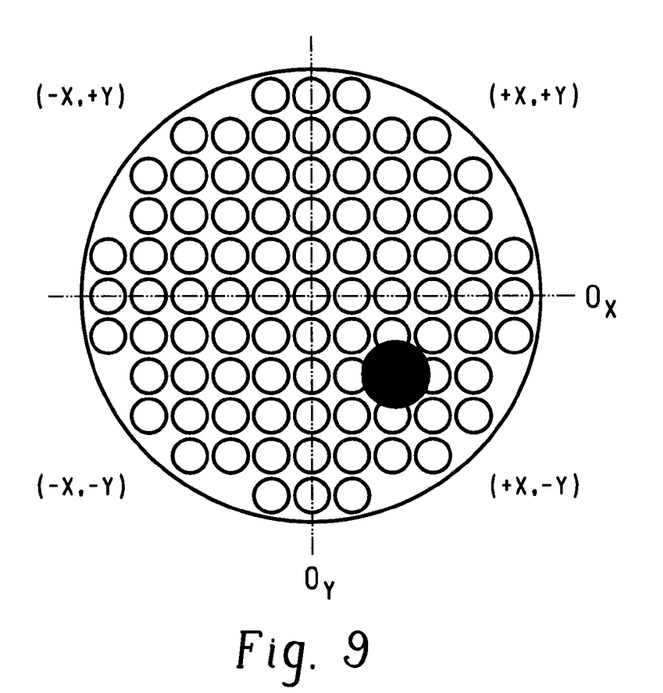

When all of the detectors of section 1 are read and the numbers and signal strengths of the identified detectors are stored in their designated memory registers as determined by block 74, then in block 78, the stored signal strengths of the identified detectors are compared and the detector having the highest signal strength is selected in block 80 for calculating the offset for control detector section 1. In this process, the number of the selected detector may be converted to its coordinates in the X-Y coordinate frame of the section using the cross-referencing look-up table configured in step 60. The instantaneous offset may be calculated from the coordinates of the selected detector. FIGS. 8 and 9 are top views of an exemplary control detector section with spot illuminations at different detectors. For example, in FIG. 8, the selected detector is at coordinates (0, 0) indicative of little or no offset. However, in the example of FIG. 9, the selected detector is at coordinates (3, −3) from which an offset may be determined.

Referring back to FIG. 7, in block 82, it is determined if offsets were calculated for both control detector sections. If not, then block 86 performs set-up conditions for monitoring the detectors of the second (CS=2) control detector section and blocks 68 through 82 are re-executed for the second section. Note that offsets are determined for both of the diagonally arranged control detector sections 50d and 52d in order to determine both rotational and translational displacement or deflection. If the offsets of both sections are substantially the same, then the displacement is considered solely translational and the offset is determined from one or the other or a combination of both of the sections. This offset may be communicated to the logic unit 10 over the control channel formed by 50'e and 50'd, for example, for use therein in determining the steering compensation for all of the beams of the data array (block 84). It is understood that the steering compensation for the beams of the emitter array 54e may be determined in logic unit 12 just as well and communicated over the control channel 50'e and 50'd for use by the logic unit 10 without deviating from the broad principles of the present invention.

On the other hand, if the offsets determined from the sections 50d and 52d are different beyond a minimum allowable range, then there is considered a rotational component in the displacement of the arrays. For example, if the depiction of FIG. 8 represents the offset of section 50d and the depiction of FIG. 9 represents the offset of section 52d, then the displacement is considered pure rotation about section 50d. This rotational offset (R, θ) may be communicated to the logic unit 10 over the control channel formed by 50'e and 50'd, for example, for use therein in determining the individual steering compensation for each of the beams of the data array (block 84). More than likely, the determined offset will include a combination of translational and rotational components, and the steering compensation for each of the data beams will be determined accordingly.

Figure 10:
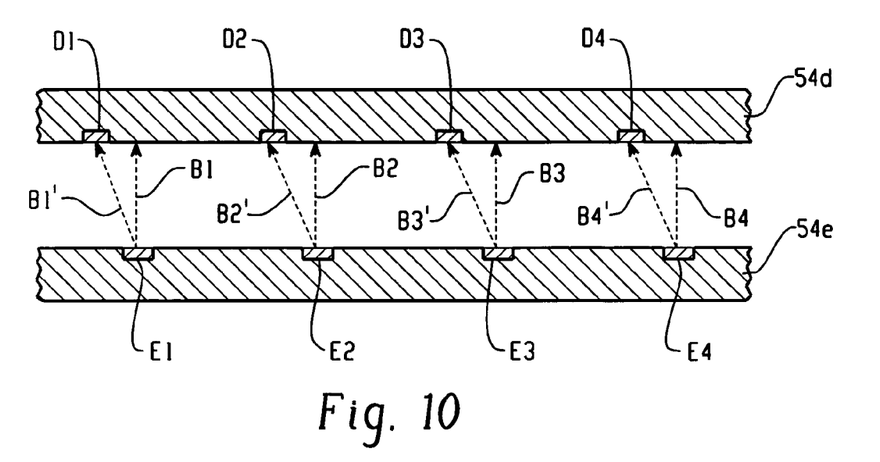
FIG. 10 is a side view illustration of data emitter and detector arrays utilizing beam steering for control of optical channel alignment.

FIG. 10 is a cross-sectional illustration of an exemplary portion of the data emitter array 54e comprising emitters E1, E2, E3, E4 and a corresponding exemplary portion of the data detector array 54d comprising detectors D1, D2, D3, D4. Beams B1, B2, B3, B4 emitted from emitters E1, E2, E3, E4 perpendicular to the surface of the array 54e are illustrated misaligned from their corresponding detectors D1, D2, D3, D4. The process described herein above in connection with FIG. 7 will determine the offset through use of the optical control channels and calculate the appropriate beam steering for each of the emitters E1, E2, E3, E4 of array 54e so that their steered beams B1', B2', B3', B4' will be aligned with and illuminate the corresponding detectors D1, D2, D3, D4 of array 54d. Control logic 10 will execute the steering commands to the emitters of the array 54e over appropriate wiring connections.

Figure 11:
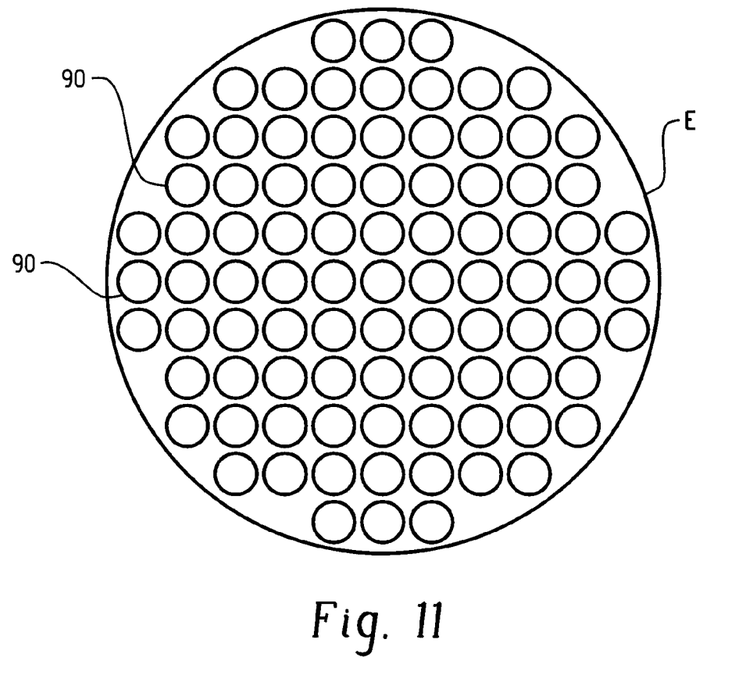
FIGS. 11-15 are examples of embodiments of a beam steerable emitter section suitable for use in controlling optical channel alignment.

FIGS. 11-15 are illustrations of exemplary embodiments of beam steering emitters suitable for use in a beam steering emitter array embodiment. Referring to FIG. 11 which is a top view of an exemplary emitter section E of array 54e, a multiplicity of laser diodes 90 is formed on a surface of array 54e in a grouping shown within a circled line which is representative of a surface area section of the exemplary emitter E. Accordingly, each light emitter section E comprises a steerable group of laser diodes, which may be low-power, vertical cavity surface emitting laser (VCSEL) diodes, for example, that emit beams of coherent light at different angles of emission. This design may be accomplished by fabricating the VCSEL diodes 90 at different angles of emission in a semiconductor process, for example. Note that each emitter section E of array 54e may be controlled to steer a laser beam to different points of the detector array 54d by applying signals individually and selectively to the group of laser diodes thereof.

Figure 12:
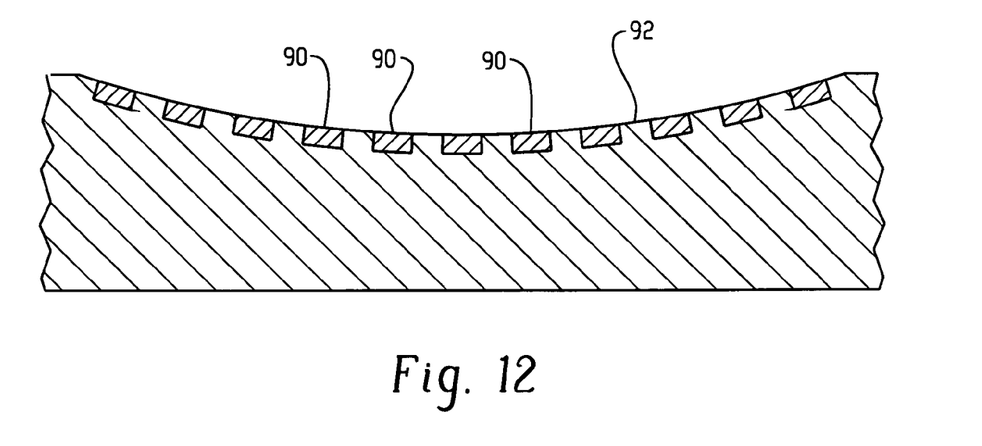
Figure 13:
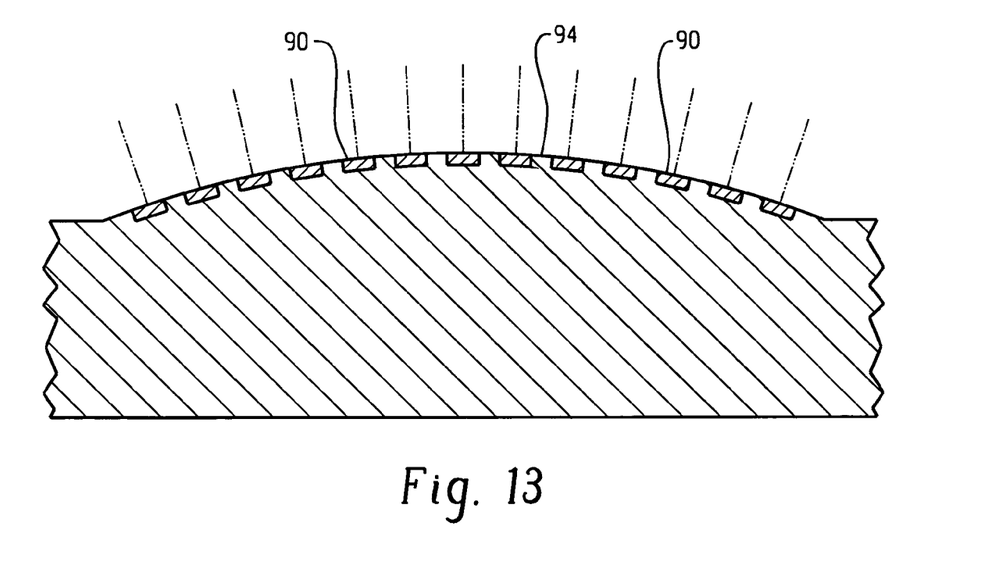

In one embodiment, each emitter section E of the array 54e may be fabricated on a semiconductor substrate, for example, as a concave surface 92 such as shown by way of example in the cross-sectional illustration of FIG. 12. The illustration of FIG. 12 is exemplary of the cross-section of a row or column of the group of laser diodes 90. Note that by way of construction each of the laser diodes 90 of each emitter section E may emit its laser beam, upon selection, toward a different spot on the surface of the array 54d. In another embodiment, the laser diodes 90 of each emitter section of the array may be fabricated on a convex shaped surface 94 of an array substrate such as illustrated in FIG. 13. In this embodiment, laser beams, designated in FIG. 13 by straight lines, may be selectively emitted from the laser diodes 90 perpendicular to the convex shaped surface 94 at different emission angles to effect a steered laser beam from each emitter section.

Figure 14:
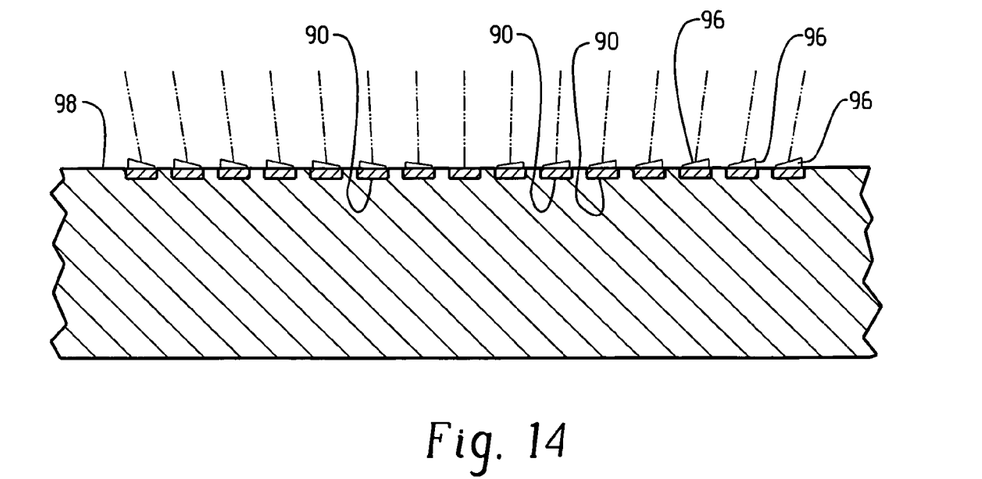
Figure 15:
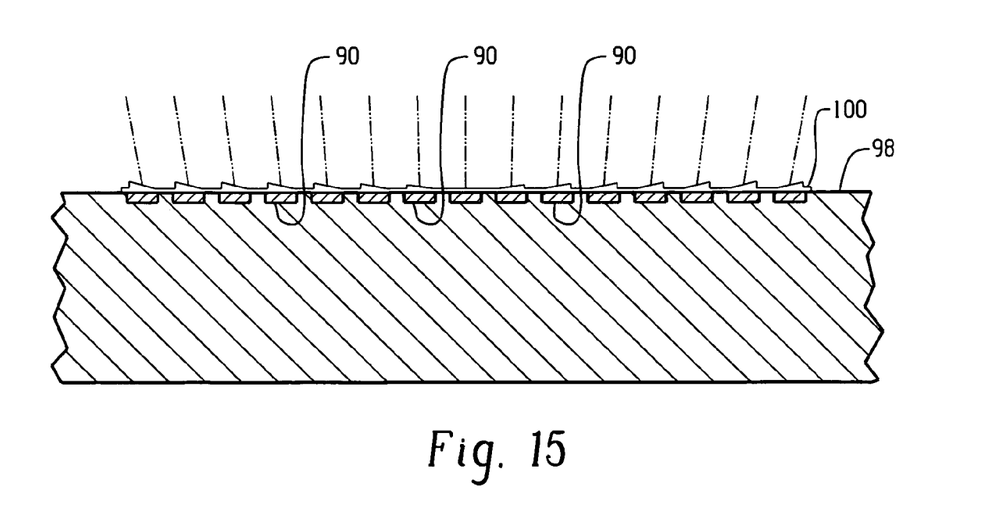

In a further embodiment, a steered laser beam from an emitter section E may be effected by fabricating an optical element 96, like a micro wedge shaped prism, for example, on top of each laser diode 90 of an emitter section as shown in the illustration of FIG. 14. In this embodiment, the laser diodes 90 of an emitter section E are fabricated on a flat surface 98 of a substrate of the array and individual micro wedge prisms 96 are fabricated on top the laser diodes 90. Accordingly, laser beams emitted from the diodes 90 that would otherwise be emitted substantially perpendicular to the flat surface 98 are directed towards the tall end of the corresponding wedge shaped prism at an angle away from the surface normal.

Note that in the present embodiment, no prism is disposed over the center laser diode of the emitter section because the laser beam emitted from the center laser diode is intended to be substantially perpendicular to the surface 98. The prisms 96 may be fabricated with different sizes to effect laser beams emitted from the laser diodes of the emitter section at different emission angles. In the embodiment of FIG. 14, the micro wedges 96 are sized proportional to the distance away from the center of their corresponding laser diodes 90. Accordingly, the laser diodes 90 of an emitter section closer to the center will emit laser beams at emission angles closer to the surface normal than those laser diodes 90 farther from the center as shown by straight lines in FIG. 14. By selectively controlling the laser diodes of an emitter section, a laser beam may be steered by the micro wedges without any moving parts.

While the embodiment of FIG. 14 comprises individual prisms 96 fabricated over the laser diodes 90, it is understood that all of prisms may be made from a single piece of glass or molded from a sheet of plastic, for example. The illustration of FIG. 15 exemplifies such an embodiment with the different sized wedge shaped prisms made from a single sheet or layer of material 100 which is disposed over the surface 98 with the prisms aligned over their respective laser diodes 90 of the emitter section. The embodiment illustrated in FIG. 15 will function similar to that described for the embodiment of FIG. 14.

Figure 16:
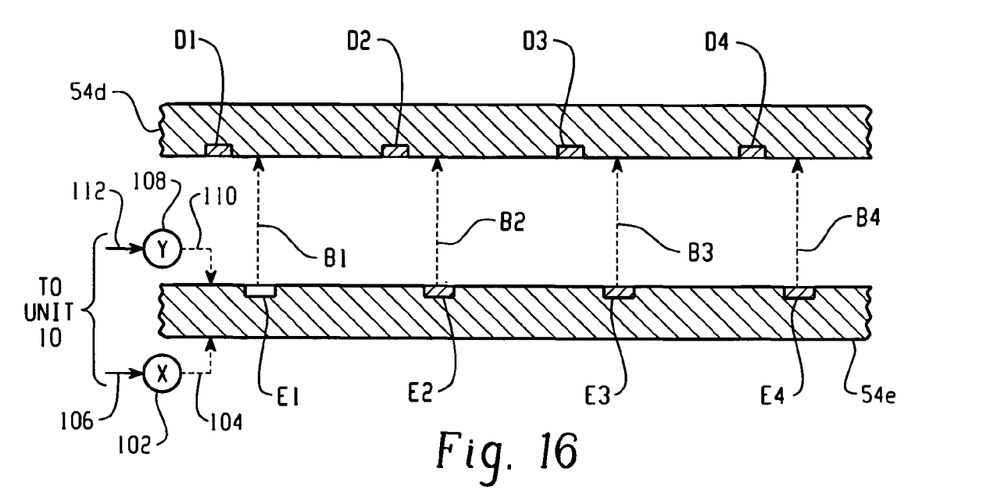
FIGS. 16 and 17 are side view illustrations of data emitter and detector arrays utilizing array positioning for control of optical channel alignment.
Figure 17:
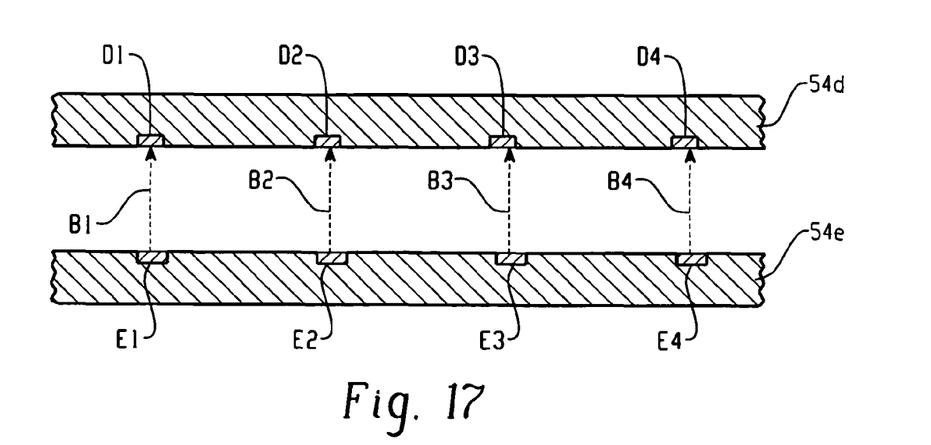

FIG. 16 is a cross-sectional illustration of the exemplary portions of the data emitter and detector arrays 54e and 54d, respectively, in accordance with an alternate embodiment for re-aligning emitted beams of the data arrays. The notation for emitters, detectors and beams will remain the same as described for FIG. 10 supra. In FIG. 16, beams B1, B2, B3, B4 emitted from emitters E1, E2, E3, E4 perpendicular to the surface of the array 54e are illustrated misaligned from their corresponding detectors D1, D2, D3, D4. The process described herein above in connection with FIG. 7 will determine the offset through use of the optical control channels and calculate the appropriate mechanical array positioning for the array 54e so that the beams B 1, B2, B3, B4 will be aligned with and illuminate the corresponding detectors D1, D2, D3, D4 of array 54d as shown in the illustration of FIG. 17.

In the embodiment of FIG. 16, mechanical positioning elements are physically coupled to the array 54e to position array 54e with respect to array 54d in accordance with the determined offsets from control sections 50d and 52d. For example, an X axis stepper motor 102 may be mechanically coupled to the array 54e by a mechanical linkage 104 for moving the array 54e along an X axis with respect to array 54d in response to position commands issued from control logic unit 10 over appropriate wiring connections 106. Likewise, a Y axis stepper motor 108 may be mechanically coupled to the array 54e by a mechanical linkage 110 for moving the array 54e along a Y axis with respect to array 54d in response to position commands issued from control logic unit 10 over appropriate wiring connections 112. The X and Y axis coordinates of the stepper motors 102 and 108 may be the same as or based on the X and Y coordinates of the control sections 50d and 52d, for example. Thus, an offset such as shown by way of example in FIG. 9 may be corrected by positioning the array 54e by the stepper motors 102 and 108 until the spot illumination of the corresponding emitted control beam falls within acceptable limits of the center of the control section such as shown in the illustration of FIG. 8. It is understood that X and Y axis movement of array 54e by the stepper motors 102 and 108 may include both translational and rotational components which may be calculated from the combination of offsets determined from the control sections 50d and 52d, for example.

While the present invention has been described herein above in connection with a plurality of embodiments, it is understood that the embodiments were presented entirely by way of example and that there is no intention of limiting the invention in any way by such embodiments. Rather, the invention should be construed in breadth and broad scope in accordance with the recitation of the claims appended hereto.

What is claimed is:

1. Apparatus for providing separate data and control optical communication channels between system functions, said apparatus comprising:
   an array of data emitters operative in response to electrical data signals generated from a first system function for emitting an array of corresponding light beams representative of said data signals;
   at least one control emitter operative in response to electrical control signals generated from said first system function for emitting light beams representative of said control signals;
   an array of data detectors for receiving light beams from corresponding data emitters of said emitter array to form an array of data optical communication channels, and conducting electrical data signals reproduced from said received light beams to a second system function;
   at least one control detector section comprising a multiplicity of light detectors in close proximity to each other for receiving light beams from said at least one control emitter to form at least one control optical communication channel, and conducting electrical control signals reproduced from said received light beams to said second system function, in which said at least one control optical communication channel is separate from said data optical communication channels; and
   a controller that determines alignment of said array of data emitters and said array of data detectors based on which of said multiplicity of light detectors of said at least one control detector section receives said light beams representative of said control signals from said at least one control emitter;
   wherein said control signals comprise data associated with an operating parameter of at least one of the array of data emitters and the array of data detectors that is communicated by optical modulation of at least one light beam in said control optical communication channel.

2. The apparatus of claim 1 including an optical medium disposed between the array of data emitters and the at least one control emitter on one side and the array of data detectors and the at least one control detector section on the other side.

3. The apparatus of claim 1 wherein the at least one control emitter is physically separated from the array of data emitters; and wherein the at least one control detector section is physically separated from the array of data detectors.

4. The apparatus of claim 1 wherein the at least one control emitter includes two control emitters; and wherein the at least one control detector section includes two control detector sections optically aligned correspondingly with the two control emitters so that the emitted light beams of each control emitter illuminates at least one of the light detectors of the corresponding control detector section.

5. The apparatus of claim 1 wherein outputs of the multiplicity of light detectors of each control section are combined together for reproducing the electrical control signals from said received light beams.

6. The apparatus of claim 1 wherein the array of data emitters, the at least one control emitter, the array of data detectors, and the at least one control detector section are operative concurrently with each another.

7. The apparatus of claim 1 wherein each of said data emitters of said array of data emitters is individually steered by said controller to align with a corresponding data detector.

8. The apparatus's of claim 7 wherein each of said data emitters of said array of data emitters comprises a plurality of light emitters configured to emit light at different angles and wherein only one of said light emitters is actuated to transmit data from said data emitter, the light emitter that is actuated being selected by said second controller so that that said data emitter is steered to a corresponding said data detector.

9. The apparatus of claim 8 wherein said plurality of light emitters are arranged at different angles along a convex support surface.

10. The apparatus of claim 8 wherein said plurality of light emitters are arranged at different angles along a concave support surface.

11. The apparatus of claim 8 further comprising a plurality of prisms, each prism being optically coupled with a corresponding light emitter to direct light from that light emitter at an angle different from other said light emitters.

12. Method of providing separate data and control optical communication channels between system functions, said method comprising the steps of:

operating an array of data emitters in response to electrical data signals generated from a first system function to emit an array of corresponding light beams representative of said data signals;

operating at least one control emitter in response to electrical control signals generated from said first system function to emit light beams representative of said control signals;

receiving light beams by an array of data detectors from corresponding data emitters of said emitter array to form an array of data optical communication channels;

conducting electrical data signals reproduced from said received data light beams to a second system function;

receiving light beams by at least one control detector section, comprising a multiplicity of, light detectors, from said at least one control emitter to form at least one control optical communication channel, in which said at least one control optical communication channel is separate from said data optical communication channels;

conducting electrical control signals reproduced from said received control light beams to said second system function;

determining alignment of said array of data emitters and said array of data detectors based on which of said multiplicity of light detectors of said at least one control detector section receives said light beams representative of said control signals from said at least one control emitter; and wherein said control signals comprise data associated with an operating parameter of at least one of the array of data emitters and the array of data detectors that is communicated by optical modulation of at least one light beam in said control optical communication channel.

13. The method of claim 12 including the step of disposing an optical medium between the array of data emitters and the at least one control emitter on one side and the array of data detectors and the at least one control detector section on the other side.

14. The method of claim 12 including the steps of: physically separating the at least one control emitter from the array of data emitters; and physically separating the at least one control detector section from the array of data detectors.

15. The method of claim 12 including the step of optically aligning a control emitter of the at least one control emitter with a control detector section of the at least one control detector section so that the emitted light beams of the control emitter illuminates at least one of the light detectors of the corresponding control detector section.

16. The method of claim 12 including the steps of combining together outputs of the multiplicity of light detectors of each control section to reproduce the electrical control signals from said received light beams.

17. The method of claim 12 including the step of concurrently operating the array of data emitters, the at least one control emitter, the array of data detectors, and the at least one control detector section with each another.

18. The method of claim 12 further comprising individually steering each of said data emitters to a corresponding data detector in response to said determining alignment of said array of data emitters and said array of data detectors.

19. The method of claim 12 wherein said determining alignment comprises determining both rotational and translational alignment of said array of data emitters and said array of data detectors.

20. Apparatus for aligning optical data communication channels between system functions utilizing at least one separate control communication channel, said apparatus comprising:

an array of data emitters operative in response to electrical data signals generated from a first system function for emitting an array of corresponding light beams representative of said data signals;

at least one control emitter operative in response to electrical control signals generated from said first system function for emitting light beams representative of said control signals;

an array of data detectors for receiving light beams from corresponding data emitters of said emitter array to form an array of data optical communication channels, and conducting electrical data signals reproduced from said received light beams to a second system function;

at least one control detector section comprising a multiplicity of light detectors disposed in an area array for receiving light beams from said at least one control emitter to form at least one control optical communication channel, and conducting electrical control signals reproduced from said received light beams to said second system function;

a first controller for monitoring the multiplicity of light detectors of said at least one control detector section to determine an offset in optical channel alignment; and a second controller for controlling the optical channel alignment based on said determined offset, wherein each of said data emitters of said array of data emitters is individually steered by said second controller to align with a corresponding data detector.

21. The apparatus of claim 20 wherein the first controller is operative to monitor the multiplicity of light detectors of the at least one control detector section to detect an illuminated light detector and to determine the offset in optical channel alignment based on a position of the illuminated light detector in the area array of the at least one control detector section.

22. The apparatus of claim 21 wherein each of the light detectors is indexed to a predetermined frame of reference relative to the at least one control detector section; and wherein the position of the illuminated light detector in the area array of the at least one control detector section is based on the predetermined frame of reference.

23. The apparatus of claim 22 wherein first controller is operative to determine the offset in optical channel alignment based on the deviation of the illuminated light detector from an origin of the frame of reference of the area array of the at least one control detector section.

24. The apparatus of claim 20 wherein the light beams of the data emitter array are controlled by positioning one of the data emitter array and data detector array with respect to the other of the data emitter array and data detector array to compensate for the determined offset in optical channel alignment.

25. The apparatus of claim 20 wherein the arrays of data emitters and data detectors are area arrays; and wherein the at least one control emitter comprises two control emitters disposed at diagonally opposed positions away from the array of data emitters; and wherein the at least one control detector section comprises two control detector sections disposed at diagonally opposed positions away from the array of data detectors, each control emitter aligned with a corresponding data detector section such that the light beams of each control emitter spot illuminate at least one of the multiplicity of light detectors of the corresponding control detector section.

26. The apparatus of claim 25 wherein the first controller is operative to detect the illuminated at least one light detector of each control detector section and the position thereof in the corresponding area array, and to determine the offset in optical channel alignment based on said positions.

27. The apparatus of claim 26 wherein the first controller is operative to detect the light detector of each control detector section having the strongest illumination signal and the position thereof in the corresponding area array, and to determine the offset in optical channel alignment based on said positions.

28. The apparatus of claim 26 wherein each of the light detectors is indexed to a predetermined frame of reference relative to the corresponding control detector section; and wherein first controller is operative to determine the offset in optical channel alignment based on deviations of the illuminated light detectors from an origin of the corresponding frame of reference.

29. The apparatus of claim 28 wherein the offset in optical channel alignment includes rotational and translational components.

30. The apparatus of claim 20 wherein the first controller is operative to combine the multiplicity of light detectors of the at least one control detector section to receive the electrical control signals.

31. The apparatus of claim 20 wherein the first controller is operative to communicate the determined offset in optical channel alignment to the second controller over an independent optical communication channel.

32. The apparatus of claim 20 wherein the array of data emitters and the at least one control emitter are disposed on a first common substrate; and wherein the array of data detectors and the at least one control detector section are disposed on a second common substrate.

33. The apparatus of claim 20 wherein the first system function comprises the second controller and the second system function comprises the first controller.

34. The apparatus of claim 20 wherein each of said data emitters of said array of data emitters comprises a plurality of light emitters configured to emit light at different angles and wherein only one of said light emitters is actuated to transmit data from said data emitter, the light emitter that is actuated being selected by said second controller so that that said data emitter is steered to a corresponding said data detector.

35. The apparatus of claim 34 wherein said plurality of light emitters are arranged at different angles along a convex support surface.

36. The apparatus of claim 34 wherein said plurality of light emitters are arranged at different angles along a concave support surface.

37. The apparatus of claim 34 further comprising a plurality of prisms, each prism being optically coupled with a corresponding light emitter to direct light from that light emitter at an angle different from other said light emitters.

* * * * *

UNITED STATES PATENT AND TRADEMARK OFFICE
CERTIFICATE OF CORRECTION

PATENT NO. : 7,809,278 B2
APPLICATION NO. : 10/898834
DATED : October 5, 2010
INVENTOR(S) : Terrel L. Morris et al.

Page 1 of 1

It is certified that error appears in the above-identified patent and that said Letters Patent is hereby corrected as shown below:

On the Title page, Inventors, Item (75), line 5, delete
"Jeffrey D. Yatter" and insert -- Jeffry D. Yetter --, therefor.

In column 10, line 51, in Claim 8, delete "apparatus's" and insert -- apparatus --, therefor.

In column 11, line 18, in Claim 12, delete "of," and insert -- of --, therefor.

Signed and Sealed this
Twenty-ninth Day of March, 2011

David J. Kappos
*Director of the United States Patent and Trademark Office*